3,073,093
Patented Jan. 15, 1963

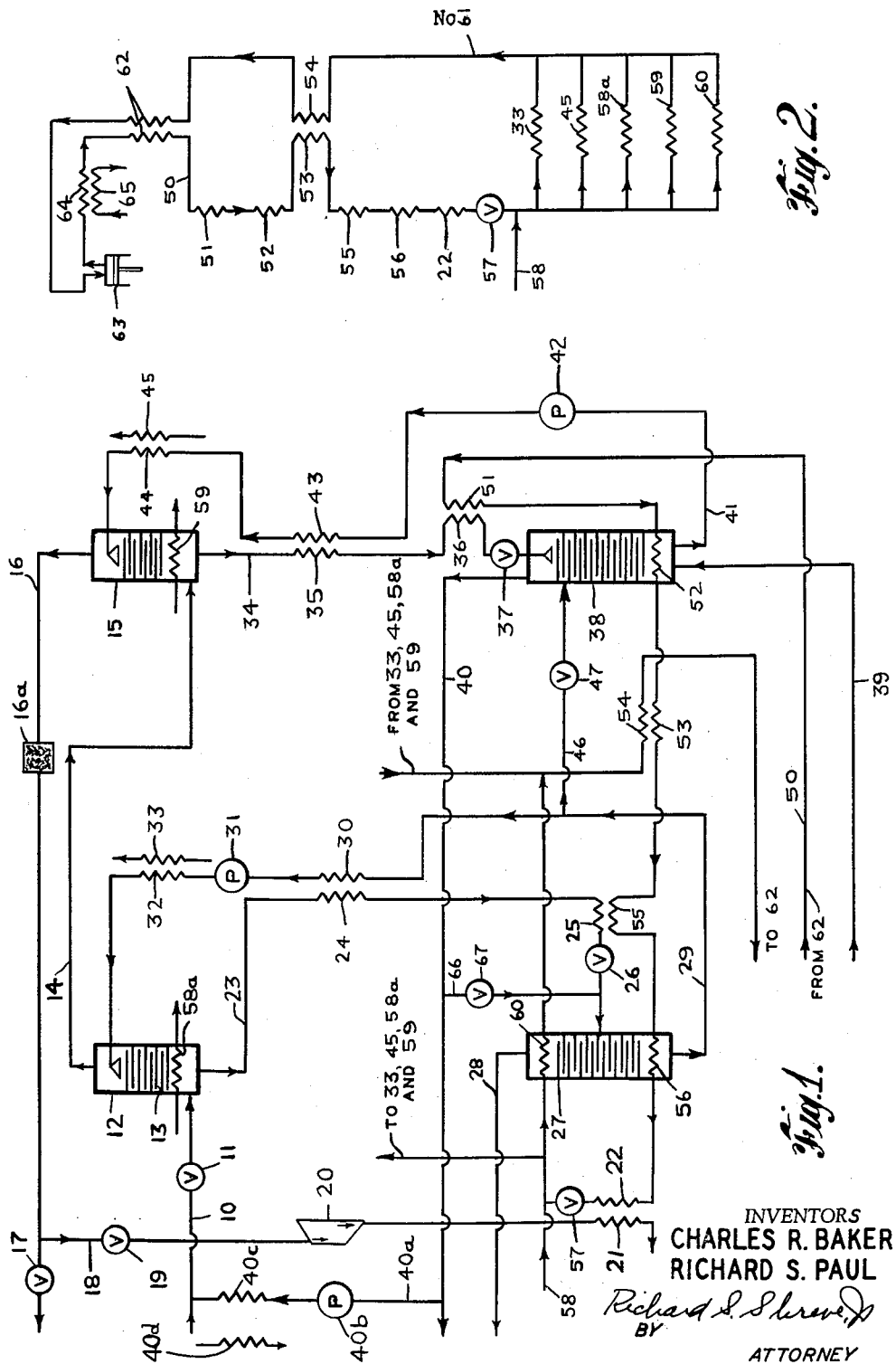

3,073,093
PROCESS AND APPARATUS FOR PURIFYING GASES
Charles R. Baker, Kenmore, and Richard S. Paul, Grand Island, N.Y., assignors to Union Carbide Corporation, a corporation of New York
Filed Nov. 12, 1959, Ser. No. 852,279
23 Claims. (Cl. 55—48)

This invention relates to improved process and apparatus for purifying gases, and more particularly for the low-temperature separation of lower boiling impurities such as nitrogen and carbon monoxide from a crude feed gas having a major constituent boiling below about −245° C., such as hydrogen, helium or neon.

A convenient source of hydrogen in large quantities is the partial oxidation of fuels such as natural gas and oil followed by the so-called "water gas shift" process. The latter converts most of the carbon monoxide produced by the partial oxidation into carbon dioxide with the simultaneous release of additional hydrogen. The gaseous crude hydrogen obtained by such methods contains carbon monoxide, carbon dioxide, methane, nitrogen and argon impurities which must be removed in order for the hydrogen to be suitable for most commercial purposes. For example, the efficiency of certain metallurgical processes such as direct reduction of iron ore is substantially improved if such contaminants are removed. Also, hydrogen intended for liquefaction must be of extremely high purity because all impurities normally encountered will solidify in the liquefier and limit the uninterrupted operation of the equipment. It has been proposed to partially accomplish the purification of hydrogen by cooling the crude hydrogen sufficiently so that the higher boiling impurities, e.g., carbon dioxide, are condensed, and then washing the lower boiling impurity-containing hydrogen with a liquid solvent such as nitrogen, methane or propane at moderately low temperatures e.g., −170° C. or warmer, so that a portion of the lower boiling impurities are absorbed therein. This purification method has several important limitations and disadvantages: For example, heavy contamination of the hydrogen product with nitrogen or methane is unavoidable if either is used as the washing liquid. If propane is used, the solubility of the lower boiling impurities in the wash liquid at −170° C. is not sufficiently high for substantially complete removal of such impurities in an economical manner. In order to obtain pure hydrogen with any of these systems, additional purification steps must be employed using separate and expensive means. Thus, commercial usage of hydrogen in large quantities has been restricted to uses which could tolerate the residual contamination left by prior art purification processes.

Other liquid washing systems have been proposed for purification of gaseous crude hydrogen, but they require relatively higher wash liquid recirculation rates and lower tray efficiencies than are desirable for a commercial process. Higher recirculation rates increase power costs, while lower tray efficiencies increase the number of actual trays needed and consequently add to the plant investment.

A principal object of the present invention is to provide a process of and apparatus for substantially complete removal of nitrogen and carbon monoxide impurities from crude low-boiling gases.

A further object is to provide a large scale purification process and apparatus for producing extremely high purity gas such as hydrogen, neon, helium and the like.

Another object of the present invention is to provide a highly efficient and economical process of and apparatus for washing a crude low-boiling feed gas with liquid solvents at such conditions of pressure and temperature as to effect substantially complete removal of lower boiling impurities including nitrogen and carbon monoxide.

A still further object is to provide a washing process and apparatus requiring substantially lower wash liquid recirculation rates and providing higher tray efficiencies than wash systems heretofore proposed for separating low-boiling impurities from crude hydrogen and the like.

These and other objects and advantages of this invention will be apparent from the following description and accompanying drawings in which:

FIG. 1 is a flow diagram of an exemplary system for purifying crude low-boiling gases, according to the present invention; and FIG. 2 is a flow diagram of a suitable closed refrigeration circuit for the purification system of FIG. 1.

The invention is predicated on the discovery that low-boiling impurities such as nitrogen and/or carbon monoxide can be efficiently and economically removed from low-boiling crude gas by first washing such feed gas with liquid methane at a low temperature below about −175° C. to remove at least most of such low-boiling impurities. The partially cleaned feed gas is then washed with a second wash liquid at about the same temperature and pressure. The second wash liquid must have a negligible vapor pressure at the washing temperature so as not to contaminate the feed gas, and a high solubility for methane.

More specifically, according to one process embodiment of the invention, a crude feed gas having a main constituent boiling below about −245° C. and containing minor amounts of nitrogen and carbon monoxide is provided at a convenient working pressure and a low temperature below about −175° C. A methane wash liquid is provided at about the same pressure and a temperature between −175° C. and −182° C., and preferably about −180° C. The cold feed gas stream is prewashed with the methane wash liquid to transfer at least most of the lower boiling impurities thereto by absorption. The lower boiling impurities are removed from the contaminated methane wash liquid and the resulting cleaned and regenerated liquid is recycled for reuse in the prewashing step.

A substantially subcooled final wash liquid is also provided at about the same working pressure as the prewashing step, and a temperature between −175° C. and −186° C., and preferably about −180° C. Such final wash liquid is selected to have low vapor pressure and a high solubility for methane. As a minimum requirement, the solubility of methane in the liquid phase of the final wash should be at least 10 times greater than the solubility of methane in the vapor phase of the final wash. Furthermore, if the process is to effectively reduce the total impurities in the hydrogen, then the final wash liquid should have a vapor pressure less than one-five hundredth of the vapor pressure of the most volatile impurity, nitrogen (measured in pure form) at such low temperature. The partially cleaned feed gas is finally washed with such wash liquid at about the same temperature and pressure as the prewashing step, thereby transferring substantially all of the remaining impurities to such final wash liquid. These impurities are then removed from the contaminated final wash liquid, and the resulting cleaned and regenerated liquid is recycled for reuse in the final washing step. In this manner, a product gas of at least 99.9% purity is readily recoverable from the final washing step, and a product gas containing 50 p.p.m. or less impurities can be obtained economically.

The impurities are preferably removed from the contaminated preliminary and final wash liquids prior to recycling by separately rewarming and throttling such liquids to a lower pressure so as to evaporate and substantially desorb such impurities, and then separating the impurities from the wash liquids. The cleaned liquids are then recooled to about the low washing temperature and recycled to the washing steps. The recooling is preferably at least partially effected by heat exchange with the respective impurity-containing wash liquids withdrawn from the washing steps.

Methane at temperatures below $-175°$ C. and preferably at about $-180°$ C. has been found to be ideally suited as the washing agent for the prewashing step for a number of reasons. It readily dissolves large amounts of nitrogen and carbon monoxide lower boiling impurities, so that a minimum of wash liquid is required. Also, it has a relatively low viscosity of about 0.2 centipoise, so that the tray efficiency in the prewash column is relatively high. Furthermore, it possesses a moderate vapor pressure of about 0.16 atmosphere at these conditions so that an excessive amount of prewash vapor is not carried into the final washing step with the partially cleaned feed gas. Finally, the impurity-containing methane liquid can be regenerated with reasonable ease at temperatures close to the prewash column temperature so as to minimize loss of refrigeration.

As previously stated, the final wash liquid must have the characteristics of a negligible vapor pressure at the low absorption temperatures to allow a very pure product gas, and a high solubility for methane to facilitate removal of any methane carried over from the prewashing step. Also, the final wash liquid should preferably have a low viscosity to provide high tray efficiencies, and be susceptible to regeneration at temperatures relatively near the low temperature of the final washing step.

Certain aliphatic hydrocarbons such as ethane, ethylene, propane, propylene or mixtures thereof are admirably suited as the final wash liquid, when subcooled to temperatures very near the freezing point of such liquid. Certain halogen-substituted hydrocarbons such as monochlorotrifluoromethane ($CClF_3$) can also be advantageously employed. For example, if propane is used, it should be cooled to a temperature below $-175°$ C. and preferably to between $-180°$ C. and $-186°$ C. since it freezes at approximately $-187°$ C. In this low temperature range, propane and similar light hydrocarbons have negligible vapor pressures and the hydrogen product is not noticeably contaminated with wash liquid vapors as a result of the washing operation. Also, since these liquids have a substantial spread between their boiling points and freezing points, the dissolved lower boiling impurities may be readily removed from a deeply subcooled wash liquid by partially rewarming and throttling such liquid to a lower pressure with very small evaporative loss. For example, if the propane wash liquid is rewarmed to about $-120°$ C. and throttled to about atmospheric pressure, the evaporative loss will be very low since the liquid is still deeply subcooled, the boiling point of propane being about $-42°$ C. at one atmosphere. Also, the viscosity of propane is only about 6 centipoises at $-180°$ C., and the high solubility of methane in propane provides high tray efficiencies. For these reasons, propane is a preferred final wash liquid.

Although the invention will now be specifically described in terms of purifying crude hydrogen, it is equally suitable for the low-temperature separation of lower boiling impurities from other feed gases having a main constituent boiling below about $-245°$ C., as for example helium, neon, and the like.

Referring now to the drawings and particularly to FIG. 1, crude hydrogen feed gas is supplied at a substantial working pressure and a low temperature below about $-130°$ C. The inlet pressure is preferably between 15 and 30 atmospheres (225 to 450 p.s.i.), and ideally about 300 p.s.i. This optimum range and the preferred pressure are those which provide a favorable balance between equipment and power costs and which permit work expansion of the product for low-temperature refrigeration, if desired, to a lower pressure still high enough for economical handling of the product. If the product is work expanded and is not required under pressure, then lower delivery pressures down to essentially one atmosphere would be possible.

The crude hydrogen feed gas contains nitrogen and/or carbon monoxide impurities, and may also contain other impurities such as argon, oxygen, methane, ethane and propane. The crude feed gas is supplied to conduit 10 at, for example about $-180°$ C. and 300 p.s.i.g., and passed through inlet valve 11 into the base of prewash column 12 for contact with downwardly flowing methane liquid, suitable liquid-vapor contact means such as trays 13 being provided. The methane prewash liquid is also preferably supplied at about $-180°$ C. and 300 p.s.i.g., and readily dissolves and absorbs nitrogen and carbon monoxide as well as the other impurities from the feed gas. About 0.6 to 1.5 mols of methane wash liquid are required per mol of contained hydrogen. When the total of the nitrogen and carbon monoxide impurities amounts to about 0.8 mol percent of the feed hydrogen, the preferred ratio is about 0.85, and when these impurities are 10 mol percent of the feed hydrogen, a ratio of about 1.0 is preferred. This ratio of liquid flow to vapor flow, normally termed $L/V$, represents an important gauge for determining the operating economy of such processes.

The prewashed hydrogen gas is discharged from the top of column 12 through conduit 14 and may contain more or less methane than the crude hydrogen entering such column, but because of the appreciable vapor pressure of liquid methane at $-180°$ C., there will be about 1 mol percent methane in the prewashed gas. The partially purified hydrogen is then introduced into the base of final wash column 15 for washing with, for example, liquid propane at about the same temperature and pressure conditions as the prewash column 12. The methane entering final wash column 15 in the hydrogen gas is absorbed by the subcooled propane liquid, and between 0.07 and 0.03 mol of propane are required per mol of contained hydrogen for this function, an $L/V$ ratio of 0.15 being preferred. Since the vapor pressure of propane is negligible at $-180°$ C., the hydrogen product gas leaving the top of final wash column 15 through conduit 16 is purified to 99.9% or higher. The purified hydrogen product gas may be discharged from the system through valve 17 for further processing as desired, or alternatively, at least part of such cold product gas may be diverted through conduit 18 and valve 19 therein for work expansion through expander 20 to a lower pressure such as 60 p.s.i.g. A portion of the resulting refrigeration may be recovered from the further cooled product hydrogen in passageway 21 by heat exchange with a refrigerant circulating through passageway 22. The partially warmed, lower pressure product hydrogen emerging from heat exchange passageway 21 is then discharged from the system through conduit 18 for use or further processing as desired.

The actual product purity obtained from the final wash liquid will depend upon the wash liquid recirculation rate and on the degree to which the wash liquid is regenerated, other factors remaining constant. Product purities on the order of 50 p.p.m. are obtainable economically from the final washing step. If still higher purities, e.g. less than 1 p.p.m., are desired, an adsorbent trap 16a may be added in the cold product conduit 16. Activated carbon is an example of a suitable adsorbent for this purpose.

The impurity-containing methane wash liquid is discharged from the bottom of prewash column 12 through conduit 23, and passed consecutively through heat exchange passageways 24 and 25 for warming therein to about $-160°$ C. The warmed contaminated wash liquid is then throttled through valve 26 to about 4 p.s.i.g. for desorption and evaporation of the impurities, and passed into methane regeneration column 27 containing suitable liquid-gas contact trays 13. Here the distillation action separates the methane stream into an overhead gaseous fraction consisting of essentially all the impurities removed in prewash column 13 plus some methane and hydrogen, and a bottom fraction of substantially pure liquid methane. The overhead fraction is vented from the top of methane regeneration column 27 through conduit 28 for release to the atmosphere, or further processing as desired. The recleaned methane liquid is withdrawn from the bottom of column 27 through conduit 29, and partially recooled in passageway 30 by heat exchange with the impurity-containing methane liquid in passageway 24. The partially recooled regenerated methane wash liquid is then pressurized by pump 31, further recooled to about —180° C. in passageway 32 in heat exchange relation with a refrigerant circulating through thermally associated passageway 33, and recycled to the top of prewash column 12 for use in the previously described manner.

The impurity-containing propane final wash liquid is discharged from the base of final wash column 15 through conduit 34, and consecutively warmed in passageways 35 and 36. The warmed, contaminated propane wash liquid is then throttled through valve 37 to a pressure of about 7 p.s.i.g. and a temperature of approximately —123° C. to desorb the impurities therefrom. The low pressure mixture is then introduced into the top of propane stripping column 38 containing for example suitable liquid-vapor contact trays. A small stream of high-purity hydrogen gas e.g. 1% of the hydrogen product at about —123° C. or warmer is fed into the base of column 38 through conduit 39, and serves to strip the methane contaminant from the descending propane final wash liquid. The off-gas from the top of stripper 38 contains hydrogen, methane and a small amount of propane, and is vented therefrom through conduit 40. Such off-gas may be vented to the atmosphere, or preferably may be recycled into the crude hydrogen feed stream to recover the hydrogen and methane therein. The latter may be achieved by diverting the off-gas through conduit 40a, repressurizing such gas in pump 40b, recooling the gas in passageway 40c by heat exchange with a suitable refrigerant in thermally associated passageway 40d, and returning the recooled and repressurized gas to crude hydrogen feed conduit 10.

The cleaned propane liquid collecting in the bottom of stripping column 38 is withdrawn through conduit 41, repressurized by pump 42 therein, and partially recooled in passageway 43 thermally associated with passageway 35 processing the impurity-containing propane liquid discharged from column 15. The partially recooled, clean wash liquid is further recooled in passageway 44 by heat exchange with a refrigerant in thermally associated passageway 45, and recycled to final wash column 15 for use in the previously described manner.

Since propane is contained in the off-gas leaving the relatively warm stripping column 38 through conduit 40, and since this off-gas may be recycled into the crude hydrogen feed stream to recover hydrogen and methane, propane may be present in the crude feed hydrogen entering the prewash column 12. Here, propane is absorbed in the liquid methane wash liquid, and since propane has a lower vapor pressure than methane, the propane will tend to build up in the methane wash liquid. Similarly, any other higher boiling impurities such as ethane or ethylene contained in the crude feed hydrogen may tend to build up in the methane wash liquid. The present invention facilitates controlling and limiting the buildup of higher boiling impurities by bleeding a small amount of cleaned methane liquid from conduit 29 through branch conduit 46 and control valve 47 therein to the top of propane stripper 38. The methane is stripped from such diverted liquid as clean gas, and vented from the stripper 38 in the off-gas in conduit 40, and returned to the prewash column 12 through connecting conduits 40a and 10.

The step of limiting the buildup of higher boiling impurities in the methane prewash liquid is advantageous for several reasons, as for example improving heat transfer coefficients in the heat exchangers because of lower liquid viscosity, and improving the tray efficiency in the methane prewash column also because of lower liquid viscosity. Another important advantage is that the reboiler temperature in the methane column is minimized when high boiling components are excluded, and therefore the cost of operating the refrigeration cycle as described below will be maintained as low as possible. A further advantage of limiting the higher boiling impurity buildup in the methane prewash liquid is that the solubility of such liquid for nitrogen and carbon monoxide is improved.

In many embodiments of the invention, buildup of higher boiling impurities in the methane is not a serious problem. For example, when coke oven gas constitutes the crude feed gas which is being processed to obtain pure hydrogen, the cooling and partial condensation steps (not shown) which may precede the methane prewashing step are designed to remove acetylene and should also remove higher boiling impurities such as propane and ethane. It is when the preliminary condensation step is omitted that impurity buildup can occur in the methane prewash liquid.

Because the present system operates at low temperatures, refrigeration is needed to balance various losses and to remove the heat liberated when the impurities dissolve in the wash liquids. Since the methane prewash liquid is regenerated at about —160° C. and the final wash liquid is regenerated at an even warmer temperature level, refrigeration is recoverable at these temperatures due to warming the liquids and desorption of the impurities. According to the present invention, such refrigeration is recovered and at least partially transferred to the prewashing and final wash columns at the —180° C. level to partially offset the heat additions mentioned above. The preferred refrigeration cycle of this invention employs a single circulating fluid, nitrogen, to pump refrigeration from the methane regeneration column and the propane stripping column, to the prewash and final wash columns.

Referring now more specifically to the drawings, FIG. 2 shows a complete refrigeration circuit which may be employed in FIG. 1, portions of the corresponding interconnecting piping between the various components being omitted from FIG. 1 for purposes of simplicity. The same reference numerals have been employed in both FIGS. 1 and 2 for identical elements.

Gaseous nitrogen at for example 350 p.s.i.g. and about —120° C. is supplied through conduit 50 to passageway 51 which is thermally associated with passageway 36 processing colder impurity-containing propane final wash liquid. The compressed gaseous nitrogen is thus partially cooled in passageway 51, and then further cooled in one or more coils 52 in the base of propane stripping column 38, where appreciable amounts of methane are being evaporated. In this manner, the heat of evaporation is transferred to the nitrogen stream as refrigeration. The further cooled compressed gaseous nitrogen is additionally cooled in passageway 53 by heat exchange with expanded nitrogen in thermally associated passageway 54, and then partially condensed in passageway 55 by heat exchange with the impurity-containing methane wash liquid in thermally associated passageway 25. The partially condensed nitrogen in conduit 50 is next directed through one or more coils 56 in the reboiler base of methane regeneration column 27, and is further condensed therein. If additional refrigeration is needed, a portion of the purified hydrogen may be work expanded and directed through passageway 21 thermally with passageway 22 for transfer of refrigeration to the condensed nitrogen therein.

The partially condensed nitrogen is next throttled through valve 57 to about 37 p.s.i.g. thereby providing a substantial quantity of liquid nitrogen for refrigeration purposes. If this quantity is insufficient to fulfill the plant's low temperature refrigeration requirements, additional liquid nitrogen may be added through conduit 58 from an external source. The available liquid nitrogen is preferably divided into five different parts and utilized to provide refrigeration in five different places as follows: One part is used to further recool the cleaned methane wash liquid in passageway 32 by flow through thermally associated passageway 33, before the methane liquid is recycled to the prewash column 12. Another portion of the liquid nitrogen refrigerant serves to further recool the cleaned propane final wash liquid in passageway 44 by flow through thermally associated passageway 45 before the propane liquid is recycled to the final wash column 15. Additional parts of such refrigerant may be passed through cooling coils 58a and 59 in the base of the prewash and final wash columns 12 and 15, respectively, so as to maintain such columns at the necessary low temperature level below about $-175°$ C. Finally, a fifth portion of the refrigerant is directed through coils 60 in the top of methane regeneration column so as to provide reflux liquid therein. It is to be understood that passageway 40d may also be incorporated in the aforedescribed liquid nitrogen refrigeration system so that the liquid refrigerant would be divided into six instead of five parts.

The liquid nitrogen refrigerant is at least partially vaporized in the aforementioned heat exchanges and collected in manifold conduit 61. The combined low pressure nitrogen stream is further warmed in passageway 54 by heat exchange with higher pressure cold nitrogen gas in thermally associated passageway 53, and additionally warmed to ambient temperature in heat exchanger 62. The resulting warm nitrogen gas is pressurized to about 350 p.s.i.g. in compressor 63, and aftercooled in passageway 64 by, for example, water in thermally associated passageway 65. The resulting high pressure nitrogen gas is then recooled in the previously described manner.

Although not illustrated in FIG. 1, the sensible refrigeration in the cold, purified hydrogen product stream would preferably be recovered by heat exchange with a warmer fluid, as for example the crude feed hydrogen to be cooled to the $-175°$ C. level. Such heat exchangers between the incoming and outgoing process streams will be obvious to those skilled in the art.

Although the preferred embodiments have been described in detail, it is contemplated that modifications of the process and the apparatus may be made and that some features may be employed without others, all within the spirit and scope of the invention as set forth herein. For example, other methods may be employed to provide the low-temperature refrigeration as for example work expansion of all of the purified hydrogen product gas. Due to the high purity of the product hydrogen, its dew point is below $-210°$ C. This provides a favorable temperature difference between the refrigerating hydrogen and the wash liquids at about $-175°$ C. If the very cold hydrogen should tend to freeze the wash liquids, the product hydrogen may be expanded in several steps with the hydrogen being warmed by the wash liquid after each expansion.

As a further variation, a refrigeration system may be provided to supply refrigeration to both the crude feed gas cooling zone (not shown) and the purification zone illustrated in FIG. 1. Refrigeration may be produced by any of several well known methods, as for example by Joule-Thompson expansion (throttling), work expansion of one or more streams, or by cascade refrigeration cycles.

The impurity-containing prewash and final wash liquids may also be regenerated by other methods, as for example substituting a separator for the propane stripping column 38. In this event, the cleaned propane liquid would probably contain more dissolved methane so that the product hydrogen may contain more methane. If such a separator were used, the off-gas therefrom may be passed to the methane regeneration column through branch conduit 66 and control valve 67 therein. This has the advantage of recovering the methane and propane values of the gas, but causes a small amount of propane to enter the liquid methane. However, the propane buildup in the methane may be controlled in the previously described manner.

What is claimed is:

1. A process for the low-temperature separation of lower boiling impurities such as at least one of nitrogen and carbon monoxide from a crude feed gas having a main constituent boiling below about $-245°$ C. including the steps of providing a feed stream including said main constituent and containing minor amounts of such lower boiling impurities at a substantial working pressure and a low temperature below about $-175°$ C.; providing methane wash liquid at about said low temperature and said working pressure; prewashing the cold feed stream with the methane wash liquid thereby transferring at least most of said lower boiling impurities to the methane wash liquid by absorption therein; removing the lower boiling impurities from the contaminated methane wash liquid for reuse of such wash liquid in the prewashing step; providing a subcooled final wash liquid at about said low temperature and working pressure, such liquid having a liquid phase solubility for methane of at least 10 times its vapor phase solubility for methane and having a vapor pressure less than approximately one-five hundredth of the vapor pressure of nitrogen at such temperature; finally washing the prewashed feed stream with said final wash liquid thereby transferring substantially all of the remaining impurities to the final wash liquid stream; removing the absorbed impurities from the contaminated final wash liquid and recycling such cleaned and regenerated final wash liquid for reuse in the final washing step.

2. A process according to claim 1 for the low-temperature separation of lower boiling impurities such as at least one of nitrogen and carbon monoxide from a crude feed gas, in which said main constituent is hydrogen.

3. A process according to claim 1 for the low-temperature separation of lower boiling impurities such as at least one of nitrogen and carbon monoxide from a crude feed gas, in which said main constituent is helium.

4. A process according to claim 1 for the low-temperature separation of lower boiling impurities such as at least one of nitrogen and carbon monoxide from a crude feed gas, in which said final wash liquid comprises at least one aliphatic hydrocarbon.

5. A process according to claim 1 for the low-temperature separation of lower boiling impurities such as at least one of nitrogen and carbon monoxide from a crude feed gas, in which said final wash liquid is propane.

6. A process according to claim 1 for the low-temperature separation of lower boiling impurities such as at least one of nitrogen and carbon monoxide from a crude feed gas, in which the impurity-containing methane and final wash liquids are separately warmed and throttled to lower pressure so as to evaporate and substantially desorb such impurities which are separated therefrom, recooled as cleaned wash liquid to about said low temperature, and recycled to the respective washing steps for reuse therein.

7. A process according to claim 6 for the low-temperature separation of lower boiling impurities such as at least one of nitrogen and carbon monoxide from a crude feed gas, in which the impurity-containing methane and final wash liquids are at least partially warmed by heat exchange with the corresponding throttled and cleaned wash liquid of the same composition.

8. A process according to claim 6 for the low-temperature separation of lower boiling impurities such as at least one of nitrogen and carbon monoxide from a crude feed gas, in which the feed gas contains higher boiling impurities which are absorbed in the methane wash liquid, and including the steps of passing the warmed and throttled impurity containing final wash liquid to a stripping zone for removal of absorbed impurities therefrom, diverting a small part of the lower boiling impurity-free and higher boiling impurity-containing throttled methane wash liquid to said stripping zone, stripping the absorbed impurities form said final wash liquid for venting from such zone, and simultaneously transferring said higher boiling impurities to said final wash liquid and evaporating the methane from such diverted liquid, returning the methane-containing vent gas from the stripping step to the methane prewashing step, the stripped lower boiling impurity-free final wash liquid being recycled to the final washing step.

9. A process according to claim 8 for the low-temperature separation of lower boiling impurities such as at least one of nitrogen and carbon monoxide from a crude feed gas, in which the final wash fluid is propane.

10. A process according to claim 1 for the low-temperature separation of lower boiling impurities such as at least one of nitrogen and carbon monoxide from a crude feed gas, in which the said main constituent is hydrogen, said final wash liquid is propane, the cleaned product gas is at least 99.9 mol percent hydrogen, the molar ratio of methane wash liquid to clean product gas is between 0.6 and 1.5, and the molar ratio of propane wash liquid to clean product gas is between 0.07 and 0.3.

11. A process according to claim 1 for the low-temperature separation of lower boiling impurities such as at least one of nitrogen and carbon monoxide form a crude feed gas, in which the said main constituent is hydrogen, said lower boiling impurities comprise about 10 mol percent of said crude feed gas, and the molar ratio of methane wash liquid to clean product gas is about 1.0.

12. A process according to claim 1 for the low-temperature separation of lower boiling impurities such as at least one of nitrogen and carbon monoxide from a crude feed gas, in which the said main constituent is hydrogen, said lower boiling impurities comprise about 0.8 mol percent of said crude feed gas, and the molar ratio of methane wash liquid to clean product gas is about 0.85.

13. A process according to claim 1 for the low-temperature separation of lower boiling impurities such as at least one of nitrogen and carbon monoxide from a crude feed gas, in which said main constituent is hydrogen, said final wash liquid is propane, the prewashing and final washing steps are effected at about $-180°$ C., and the product gas contains less than 50 p.p.m. impurities.

14. A process according to claim 1 for the low-temperature separation of lower boiling impurities such as at least one of nitrogen and carbon monoxide from a crude feed gas, in which said main constituent is hydrogen, said final wash liquid is propane, the prewashing and final washing steps are effected at about $-180°$ C., the final washed feed gas is passed through an adsorption bed for removal of impurity traces, and the product gas therefrom contains less than 1 p.p.m. impurities.

15. A process according to claim 6 for the low-temperature separation of lower boiling impurities such as at least one of nitrogen and carbon monoxide from a crude feed gas, in which refrigeration is separately recovered from said impurity-containing methane and final wash liquids during their respective impurity separation steps, and at least partially transferred to the prewashing and final washing steps.

16. A process according to claim 6 for the low-temperature separation of lower boiling impurities such as at least one of nitrogen and carbon monoxide from a crude feed gas, in which a circulating refrigerant is provided and consecutively recovers refrigeration from said final wash liquid and said methane wash liquid during their respective impurity separation steps, and at least partially transfers the recovered refrigeration to the prewashing and final washing steps.

17. A process according to claim 15 for the low-temperature separation of lower boiling impurities such as at least one of nitrogen and carbon monoxide from a crude feed gas, in which the refrigeration transfer is effected by circulating nitrogen fluid.

18. A process according to claim 16 for the low-temperature separation of lower boiling impurities such as at least one of nitrogen and carbon monoxide from a crude feed gas, in which said circulating refrigerant is nitrogen.

19. Apparatus for the low-temperature separation of lower boiling impurities such as at least one of nitrogen and carbon monoxide from a crude feed gas having a main constituent boiling below about $-245°$ C. including means by which a feed stream having said main constituent and containing minor amounts of such lower boiling impurities is provided at a higher pressure and a low temperature below about $-175°$ C.; means for prewashing the cold feed stream at about said low temperature and said higher pressure with methane wash liquid thereby transferring at least most of said lower boiling impurities to said methane wash liquid by absorption therein; means for warming the impurity-laden methane wash liquid to a higher temperature; means for removing the lower boiling impurities from the warmed contaminated methane wash liquid; means for cooling the impurity-depleted methane wash liquid to said low temperature; heat pumping means comprising a refrigeration circuit for pumping heat from the methane wash liquid cooling means to the methane wash liquid warming means; means for recycling the cleaned methane wash liquid for reuse in the prewashing means; means for providing a subcooled final wash liquid at about said low temperature and said higher pressure, such liquid having a liquid phase solubility for methane of at least 10 times its vapor phase solubility for methane and having a vapor pressure less than approximately one-five hundredth of the vapor pressure of nitrogen at such low temperature; means for finally washing the prewashed feed stream with said subcooled final wash at about said low temperature and said higher pressure thereby transferring substantially all of the remaining impurities to the final wash liquid by absorption therein; means for warming the impurity-laden final wash liquid to a higher temperature; means for removing the absorbed impurities from the warmed contaminated final wash liquid; means for cooling the impurity-depleted final wash liquid to said low temperature; heat pumping means comprising a refrigeration circuit for pumping heat from the final wash liquid cooling means to the final wash liquid warming means; and means for recycling the cleaned final wash liquid for reuse in the final washing means.

20. Apparatus according to claim 19 for the low-temperature separation of lower boiling impurities such as at least one of nitrogen and carbon monoxide from a crude feed gas, in which the wash liquid impurity removal means comprise separate means for throttling the impurity-containing methane and final wash liquids to lower pressure so as to evaporate and substantially desorb such impurities therefrom; and means for separating the desorbed impurities from the warmed and throttled wash liquids.

21. Apparatus according to claim 20 for the low-temperature separation of lower boiling impurities such as at least one of nitrogen and carbon monoxide from a crude feed gas, in which the feed gas contains higher boiling impurities which are absorbed in the methane wash liquid, including stripping means for separating impurities from the warmed and throttled final wash liquid, means for diverting a small part of the lower boiling impurity-free and higher boiling impurity-containing throttled methane wash liquid to said stripping means for transfer of said higher boiling mpurities to said final wash liquid and evaporation of the methane from such diverted liquid for discharge from such stripping means, and means for returning the methane-containing vent gas from said stripping means to the prewashing means.

22. Apparatus according to claim 20 for the low-temperature separation of lower boiling impurities such as at least one of nitrogen and carbon monoxide from a crude feed gas, in which separate means are provided for recovering refrigeration from said impurity-containing methane and final wash liquids in said means for separating the desorbed impurities from the warmed and throttled wash liquids, and means for transferring at least part of such recovered refrigeration to the prewashing and final washing means.

23. Apparatus according to claim 20 for the low-temperature separation of lower boiling impurities such as at least one of nitrogen and carbon monoxide from a crude feed gas, including means for consecutively circulating a refrigerant through the final wash liquid impurity separation means and the methane wash liquid impurity separation means to recover refrigeration therefrom, and means for thereafter circulating at least portions of such refrigerant though the prewashing and final washing means for transfer of refrigeration thereto.

References Cited in the file of this patent

UNITED STATES PATENTS

| | | |
|---|---|---|
| 2,250,949 | Gerlach | July 29, 1941 |
| 2,857,018 | Partridge et al. | Oct. 21, 1958 |